(12) United States Patent
Tarvainen

(10) Patent No.: US 10,051,232 B2
(45) Date of Patent: Aug. 14, 2018

(54) ADJUSTING TIMES OF CAPTURE OF DIGITAL IMAGES

(71) Applicant: Microsoft Technology Licensing, LLC, Redmond, WA (US)

(72) Inventor: Tomi Tarvainen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/253,709

(22) Filed: Aug. 31, 2016

(65) Prior Publication Data

US 2018/0063471 A1  Mar. 1, 2018

(51) Int. Cl.
*H04N 5/92* (2006.01)
*G06K 7/14* (2006.01)
*G11B 27/10* (2006.01)

(52) U.S. Cl.
CPC ......... *H04N 5/9201* (2013.01); *G06K 7/1404* (2013.01); *G11B 27/10* (2013.01)

(58) Field of Classification Search
CPC .............. H04N 5/9201; G06F 17/3012; G06K 7/1404–7/1473; G11B 27/10; G11B 27/3036; G11B 27/322
See application file for complete search history.

(56) References Cited

U.S. PATENT DOCUMENTS

| | | | |
|---|---|---|---|
| 5,596,696 A * | 1/1997 | Tindell | G06F 17/30017 345/473 |
| 7,308,085 B2 | 12/2007 | Weissman | |
| 7,747,625 B2 | 6/2010 | Gargi et al. | |
| 8,621,355 B2 | 12/2013 | Eppolito et al. | |
| 9,092,457 B2 | 7/2015 | Wang et al. | |
| 2011/0055765 A1 | 3/2011 | Neubrand et al. | |
| 2014/0250184 A1 | 9/2014 | Brown et al. | |
| 2015/0046192 A1 | 2/2015 | Raduchel | |
| 2015/0098690 A1 | 4/2015 | Abbate et al. | |
| 2015/0163302 A1 | 6/2015 | Armstrong et al. | |
| 2015/0310891 A1 | 10/2015 | Pello et al. | |
| 2016/0005007 A1 | 1/2016 | Marsico | |

OTHER PUBLICATIONS

"Tiny QR codes with Huge possibilities!", Retrieved on: Apr. 20, 2016, 1 page, Available at: http://tinyqr.com/.
"E-WMS scanner settings—Production issues", Retrieved on: Apr. 20, 2016, 5 pages, Available at: http://www.exactsoftware.com/does/DocView.aspx?DocumentID=%7B00e16e71-4602-4c6f-aa0c-acad017a807a%7D.

* cited by examiner

*Primary Examiner* — Lin Ye
*Assistant Examiner* — Chriss Yoder, III

(57) ABSTRACT

An apparatus comprises a processing unit configured to: obtain image data and metadata of digital image frames captured by a capturing device, the metadata comprising initial time of capture determined in accordance with an internal clock of the capturing device, the at least one digital image frame comprising a reference digital image frame captured of a scene comprising a machine-readable time marking indicating reference time; recognize a reference instant of time on the basis of the image data of the reference digital image frame; determine a time offset between the reference instant of time and the initial time of capture of the reference digital image frame; and adjust the metadata of a digital image frame so as to include corrected time of capture.

20 Claims, 6 Drawing Sheets

ADJUSTING TIMES OF CAPTURE OF DIGITAL IMAGES

BACKGROUND

Digital image frames may be captured by various types of devices, such as digital cameras and portable and mobile devices incorporating a digital camera or a digital camera module. When being collected, for example, for displaying purposes, image data of a plurality of digital image frames may be arranged and organized, for example, chronologically on the basis of the times of capture thereof.

Reliability of arranging or organizing image data of a plurality of digital image frames may be affected, for example, by the accuracy and the time zone of the internal clocks of capturing device(s) by which the digital image frames were captured.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An apparatus is disclosed which may comprise a processing unit which is configured to obtain image data and metadata of at least one digital image frame captured by a capturing device, the metadata comprising initial time of capture of the digital image frame, which initial time of capture is determined in accordance with an internal clock of the capturing device, the at least one digital image frame comprising a reference digital image frame captured of a scene comprising an optical machine-readable time marking indicating reference time.

The processing unit may be further configured to recognize a reference instant of time on the basis of the image data of the reference digital image frame; to determine a time offset between the reference instant of time and the initial time of capture of the reference digital image frame; and to adjust the metadata of one or more of the obtained digital image frame so as to include corrected time of capture, determined on the basis of the initial time of capture of that digital image frame and the time offset.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of a number of embodiments and is not intended to represent the only forms in which the embodiments may be constructed, implemented, or utilized.

At least some of the embodiments and examples described below may allow, for example, reliable and efficient correction of time of capture of one or more digital image frames so as to be in accordance with a reference clock and reference time determined thereby. In the case of digital image frames captured by different capturing devices, the times of capture of digital image frames captured by different capturing devices may be corrected correspondingly, thereby putting all the digital image frames on a common timeline. As being based on recognizing an optical, computer-readable time marking, that correction is independent on the manufacturer or type of the capturing device or on the imaging application used there.

The apparatus 100 of FIG. may be, for example, a server computer which may be configured to operate as part of a cloud service or for any other appropriate server operations, a personal computer, a laptop computer, a tablet computer, a smartphone, a mobile phone, a digital image displaying apparatus configured to serve for displaying digital images or an apparatus of any other appropriate type.

The apparatus 100 comprises a processing unit 110 which is configured to obtain four media data entities 120', 120" each comprising image data 131', 131" and metadata 132', 132" of a digital image frame 130', 130" captured by a capturing device 140. Four is one example and in other embodiments, any appropriate number of media data entities may be obtained by a processing unit. In an embodiment, there may be only one such media data entity to be obtained by the processing unit.

Obtaining a media data entity comprising image data and metadata of a digital image frame constitutes an example of obtaining image data and metadata of that digital image frame.

A "digital image frame", or shortly a "frame", refers to a data content captured via exposure of pixels or some other light-sensing element(s) of an image sensor. A frame thus comprises image data enabling composition of a displayable digital image on the basis of that image data. Image data of a digital image frame may comprise, for example, information about light energy received by pixels of an image sensor. A frame may be captured as a frame for a still image or as one frame of a video sequence or some other frame sequence or group of frames.

Figure 1:
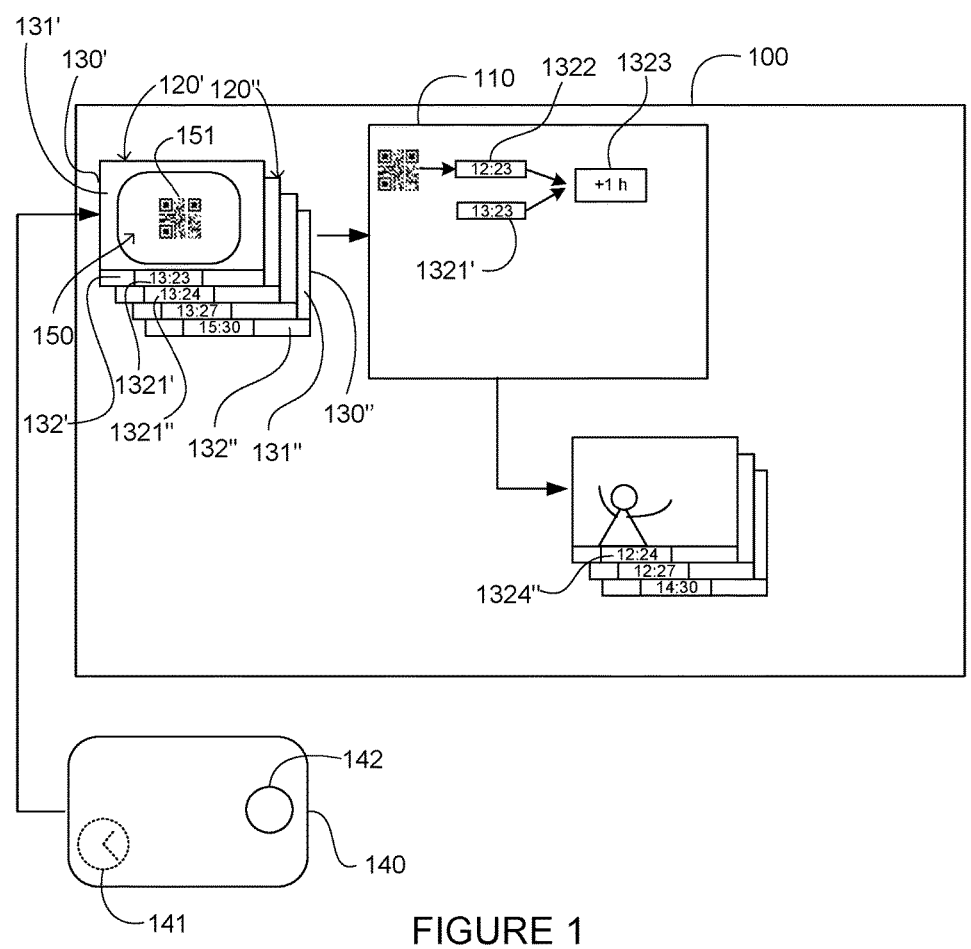
FIGS. 1 to 3 illustrate schematically apparatuses capable of adjusting time of capture of digital image frames.

In the example of FIG. 1, each obtained media data entity 120', 120" comprises image data and metadata of one digital image frame 130', 130". In other embodiments, one media data entity may comprise image data and metadata of several digital image frames.

"Obtaining" a media data entity or any other appropriate data content refers to any appropriate way of providing available, for automatic data processing and/or storage purposes, such data content. For example, such data content or a part of such may be obtained via any appropriate wired or wireless data transmission path from another device or apparatus or another unit of the same apparatus, from an external data server or, for example, from a cloud service. Such data content may also be stored in or on any appropriate data storage unit, element, medium, or device, from which the processing unit may obtain the data content.

Obtaining may also comprise, for example, a media data entity, at least part of the data of which having been captured and/or generated by the same apparatus, a part of which the processing unit forms. Then, the apparatus may also serve as the capturing device. This may be the case, for example, when the apparatus comprises an image sensor forming a part of a digital camera, capable of capturing digital image frames. Such digital camera may be implemented, for example, as a digital camera module incorporated in a mobile or portable device such as a mobile phone, a laptop computer, or a tablet computer.

In general, a capturing device may comprise any type of device incorporating a digital image sensor configured to capture digital image frames. In addition to various types of general purpose computing or communicating devices, the capturing device may be a specific imaging device or apparatus, such as a compact digital camera or a digital single-lens reflex (DSRL) camera. In the example illustrated in FIG. 1, the capturing device 140 is a mobile device with a digital camera 142 incorporated therein.

The metadata of a digital image frame may be generated and arranged according to any appropriate data format, and associated to the corresponding image data in any appropriate manner. For example, time of capture may be arranged as any appropriate type of time stamp.

The metadata of each a digital image frame comprises initial time of capture 1321', 1321" of the digital image frame 130', 130", determined in accordance with an internal clock 141 of the capturing device 140.

A "clock" refers to a device, element, component, unit, or module being configured to continuously, possibly at discrete intervals, determine and provide the present time.

An "internal clock" of a capturing device refers to an electric or electronic clock element, component, unit, or module which may be implemented in any appropriate manner utilizing principles and equipment as such known in the art. For example, an internal clock may be implemented as an application-specific integrated circuit (ASIC) module or as a general-purpose processor and a memory, the memory comprising program code instructions which, when run on the processor, cause the processor to operate to serve for the clock operations. An internal clock may be a separate member incorporated in the capturing device or it may be incorporated as part of some other unit or module of the capturing device, such as the processing unit.

An internal clock may operate on the basis of time determined during the manufacturing process thereof. Alternatively, the clock may be calibrated or updated, for example at intervals specified by the device automatically or by user thereof, to follow a general or external time determined by some external source. Further, when the capturing device location is changed from one time zone to another, the internal clock thereof may be updated automatically or in response to a user input.

An action or operation being carried out "on the basis of" one or more factors refer to those factors being taken into account in that action or operation in such a way that the outcome of the action or operation depends on those factors, those factors thereby affecting the way of carrying out the action or operation. For example, the operation of an internal clock on the basis of a specific timeline, such as time determined during the manufacturing process of the internal clock refer to that clock displaying or otherwise indicating time which is determined by, or dependent on, that timeline.

Being "determined in accordance with an internal clock of the capturing device" refers to the initial time of capture being the time of capture in the timeline of the internal clock of the capturing device.

The four obtained media data entities comprise a reference media data entity 120' which comprises image data 131' and metadata 132' of a reference digital image frame 130' having been captured of a scene 150 which, at the time of capturing the reference digital image frame, comprised a QR code 151 indicating reference time. Further, the obtained media data entities comprise three regular media data entities 120" each of which comprising image data 131" and metadata 132" of a regular digital image frame 130".

The QR code 151 of the embodiment of FIG. 1 represents an example of a graphic binary code in the form of a matrix or two-dimensional barcode forming at least part of an optical machine-readable time marking. In other embodiments, a two-dimensional barcode may be formed in accordance with some other standard, such as Aztec Code, Data Matrix, or PDF417. In yet other embodiments, instead of a two-dimensional or matrix barcode, a graphic binary code may be a linear or one-dimensional barcodes formed in accordance with any appropriate standard, such as Code 11, Code 25, Code 39, and other "Code" standards, various EAN standards, and various GS1 standards.

"Graphic binary code" refers to a code in which information is coded in a pattern formed of spatially alternating areas of two different colors, e.g. black and white. In addition to different colors distributed in separate areas along a horizontal plane, in some embodiments, such code may further comprise height variations. One example of such codes is a three-dimensional barcode which may be implemented, for example, as a QR type code with the black and/or white regions (or regions with any other appropriate colors) lying at different heights or levels.

In yet other embodiments, an optical machine-readable time marking may comprise any other appropriate form than a graphic binary code. It may be possible, for example, to have a time marking in the form of digital numbers indicating the reference time, or in the form of an analog time displaying the time with using hands.

"Optical" refers to optically detectable nature of the time marking, allowing capturing a digital image frame of a scene comprising the time marking, in which digital image frame the time marking is detectable. "Machine-readable" refers further to the nature of the time marking allowing detecting and recognizing the time marking in such digital image frame, on the basis of the image data thereof, by digital image processing and analyzing operations.

"Reference time" refers to time determined in accordance with a reference clock. The reference clock may be, for example, an internal clock of any appropriate apparatus, the time of which, i.e. the "reference time", being displayed as an optical machine-readable time marking on a display. Such display may be incorporated in the same apparatus which comprises the processing unit, or in another apparatus or device.

The processing unit is further configured to recognize a reference instant of time 1322 on the basis of the image data 131' of the reference digital image frame 130' captured of the scene comprising the QR code 151. That recognition may be thus based on the QR code indicating the reference time.

The reference instant of time indicated by the QR code or, in other embodiments, by another optical machine-readable time marking, represents the instant of the reference time when the reference digital image frame was captured.

Recognizing the reference instant of time may be based on detecting the QR code and determining the reference instant of time indicated thereby using any appropriate computer vision or machine vision principles and operations comprising, for example, various image processing algorithms.

With the initial time of capture 1321' of the reference digital image frame 130' and the reference instant of time 1322 available, the processing unit 110 is further configured to determine a time offset 1323 between those two.

The time offset may result, for example, from different time zones of the internal clock 141 of the capturing device 140 and the reference time. This kind of situation may result, for example, when the location of the capturing device is moved from one time zone to another and the internal clock thereof is not updated automatically. In other examples, a time offset may result, for example, from inaccuracy of the internal clock of the capturing device.

The processing unit is further configured to adjust metadata 132" of the regular digital image frames 130" of the regular media data entities 120" so as to include corrected times of capture 1324" determined on the basis of the initial times of capture 1321" and the time offset 1323. Corrected time of capture of a digital image frame may be the time of capture of that digital image frame on the timeline of the reference time, i.e. the instant of time of capturing that digital image frame, determined in accordance with the reference clock. In other embodiments, corrected times of capture may be determined so as to be delayed or advanced relative to the time of capture of that digital image frame on the timeline of the reference time.

In the example of FIG. 1, the processing unit is configured to carry out that adjustment by replacing the initial times of capture of the regular digital image frames by corrected times of capture. In other embodiments, metadata of digital image frames may be adjusted by adding therein corrected times of capture in addition to the existing initial times of capture.

In the example of FIG. 1, the processing unit 110 adjusts only the metadata 132" of the regular digital image frames 130". In other embodiments, also the metadata 132' of the reference digital image frame 130', or only that, may be adjusted. For example, in an embodiment with only one media data entity to be obtained by a processing unit, namely, a reference media data entity, the processing unit may adjust the metadata of the reference digital image frame.

In the example of FIG. 1, the reference digital image frame 130' is captured so that the QR code 151 covers the main part of the image area. The reference digital image frame 130' is specifically intended for providing the reference time.

In other embodiments, reference digital image frames may be used where an optical machine-readable time marking forms a part of a general scene only. This may be the case, for example, in embodiments where just one media data entity with one digital image frame is obtained by a processing unit.

A reference digital image frame for providing the reference time may be captured, for example, of a display of an apparatus, showing the QR code or, in other embodiments, another type of optical machine-readable time marking. Such display may be, for example, a display of a portable or mobile apparatus comprising a reference clock, or a specific display device displaying an optical machine-readable time marking of a reference clock. In the latter case, it is possible, for example, to have a large screen at a venue of a public event or at any public place. People capturing digital image frames at such venue or place may then capture one digital image frame of a scene comprising the screen to serve as a reference digital image frame to provide the reference time information.

Being "configured to" perform the above operations when in use refers to the capability of and suitability of a processing unit for such operations. This may be achieved in various ways. For example, the processing unit may comprise at least one processor and at least one memory coupled to the at least one processor, the memory storing program code instructions which, when run on the at least one processor, cause the processor to perform the action(s) at issue. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The processing unit may be a dedicated unit or sub-unit of a larger unit or module, specifically designed for the above operations. Alternatively, it may be a general purpose unit or sub-unit of the apparatus, also configured to operate other operations and actions.

Figure 2:
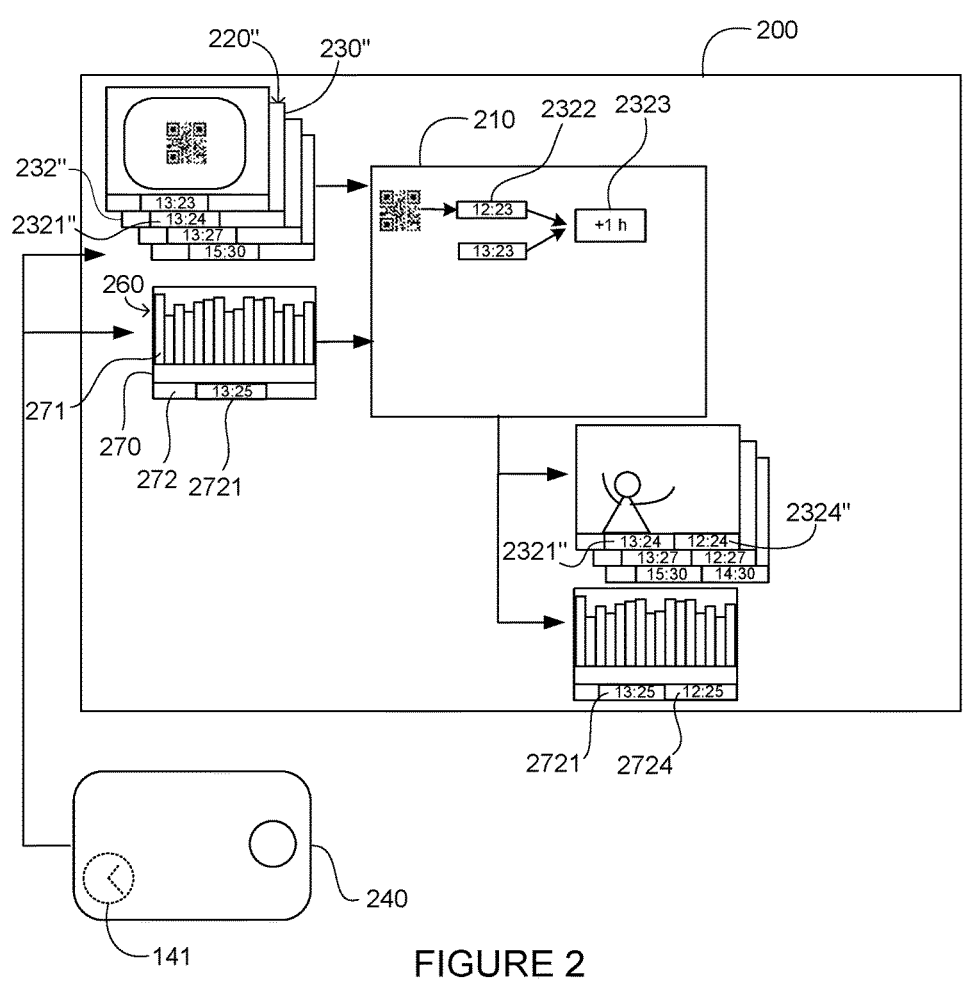

The apparatus 200 of FIG. 2 differs from that of FIG. 1 at least in that the processing unit 210 is configured to further obtain audio data 271 and metadata 272 of a digital audio sample 270 captured by the capturing device 240. In the example of FIG. 2, those are arranged in a separate media data entity in the form of an audio data entity 260. In other embodiments, audio data and metadata of a digital audio sample may form a part of a media data entity which also comprises image data and metadata of one or more digital image frames.

The metadata 272 of the digital audio sample comprises an initial time of capture 2721 of the digital audio sample, which may indicate, for example, the starting time of the digital audio sample capturing.

The processing unit 210 is configured to adjust also the metadata 272 of the digital audio sample 270, correspondingly to the adjustment of the metadata 232" of the regular digital image frames 230" of the regular media data entities 220", so as to include corrected time of capture 2724 which is determined on the basis of the initial time of capture 2721 of the digital audio sample and the time offset 2323 determined between the initial time of capture 2321' of the reference digital image frame 230' and the reference instant of time 2322.

The apparatus 200 of FIG. 2 further differs from that of FIG. 1 in that the processing unit is configured to adjust the metadata 272 of the digital audio sample 270 and the metadata 232" of the regular digital image frames 230" so that the corrected times of capture 2724, 2324" are added to those metadata without removing the initial times of capture 2721, 2321".

Figure 3:
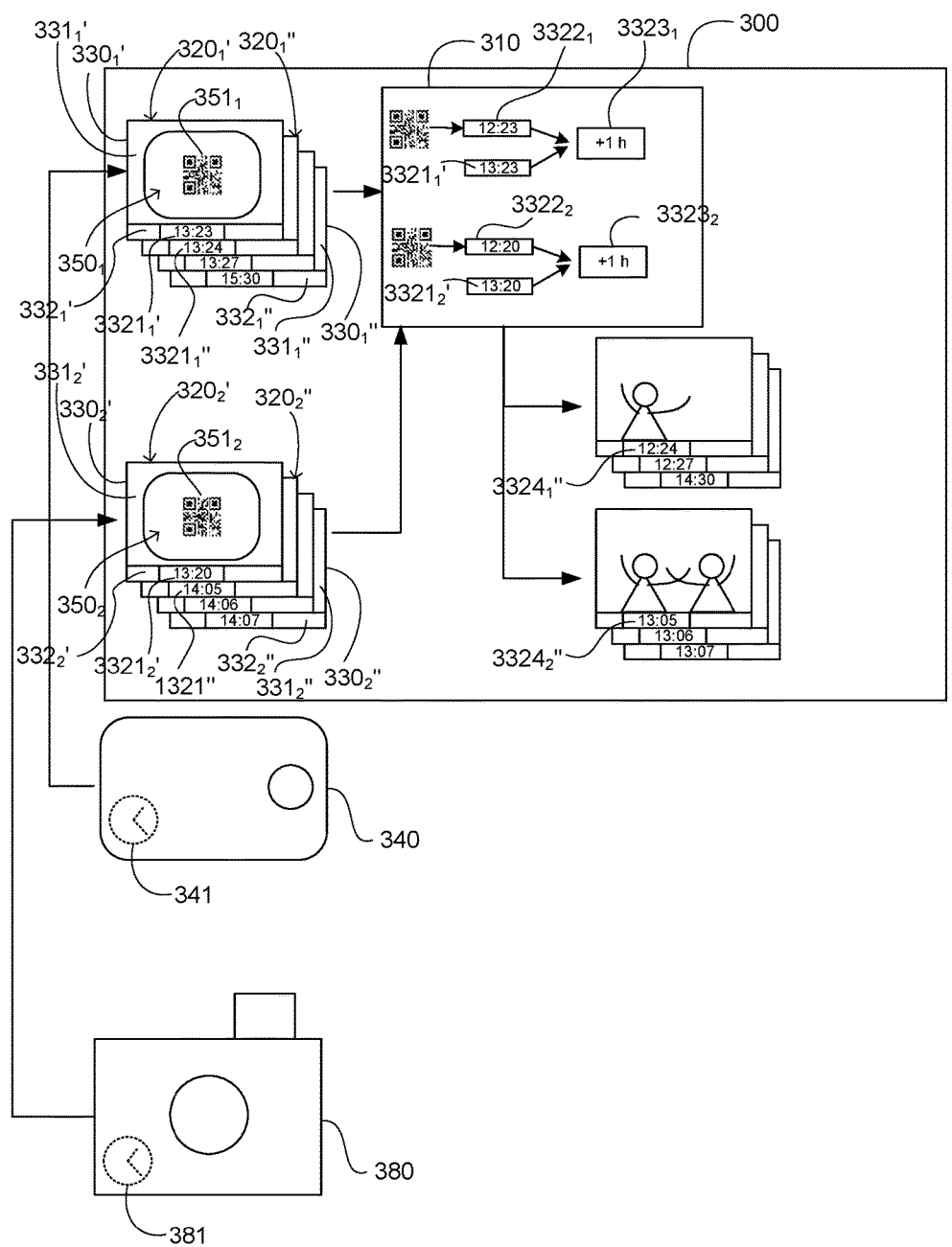

The apparatus 300 of FIG. 3 differs from that of FIG. 1 at least in that the processing unit 310 is configured to obtain a first group of first media data entities $320_1'$, $320_1''$ comprising image data $331_1'$, $331_1''$ and metadata $332_1'$, $332_1''$ of first digital image frames $330_1'$, $330_1''$ captured by a first capturing device 340 comprising a first internal clock 341; and to obtain a second group of second media data entities $320_2'$, $320_2''$ comprising image data $331_2'$, $331_2''$ and metadata $332_2'$, $332_2''$ of second digital image frames $330_2'$, $330_2''$ captured by a second capturing device 380 comprising a second internal clock 381. In the example of FIG. 3, the second capturing device is a digital camera. In other embodiments, other types of devices may be used.

Both groups of media data entities may be in accordance with any of the media data entities discussed above with reference to FIG. 1.

The first group of media data entities comprise a first reference media data entity $320_1'$ which comprises image data $331_1'$ and metadata $332_1'$ of a first reference digital image frame $330_1'$ having been captured of a first scene $350_1$ which, at the time of capturing the reference digital image frame, comprised a first optical machine-readable time marking $351_2$.

The second group of media data entities comprise a second reference media data entity $320_2'$ which comprises image data $331_2'$ and metadata $332_2'$ of a second reference digital image frame $330_2'$ having been captured of a second scene $350_2$ which, at the time of capturing the reference digital image frame, comprised a second optical machine-readable time marking $351_1$.

The first and the second time markings $351_1$, $351_2$ indicate common reference time, i.e. the same reference time determined in accordance with a common reference clock (not illustrated). This may be an internal clock of the apparatus 300 itself or any appropriate clock as discussed above with reference to FIG. 1. The time markings may be showed on the same display or on separate displays possibly positioned at different locations.

In the example of FIG. 3, the time markings comprise QR codes. In other embodiments, other types of graphic binary codes, or time markings without any graphic binary codes, may be used.

The processing unit 310 is further configured to recognize first and second reference instants of time $3322_1$, $3322_2$ on the basis of the image data of the first and the second reference digital image frames, respectively, and determine a first and a second time offset $3323_1$, $3323_2$ between the first and the second reference instants of time and the initial times of capture $3321_1'$, $3321_2'$ of the first and the second reference digital image frames, respectively.

The processing unit 310 is also configured to adjust metadata of the regular digital image frames $330_1''$ captured by the first capturing device 340 so as to include corrected times of capture $3324_1''$ determined on the basis of the initial times of capture $3321_1''$ of the first digital image frames and the first time offset $3323_1$.

Correspondingly, the processing unit 310 is configured to adjust metadata of the regular digital image frames $330_2''$ captured by the second capturing device 380 so as to include corrected times of capture $3324_2''$ determined on the basis of the initial times of capture $3321_2''$ of the second digital image frames and the second time offset $3323_2$.

Such determination of a corrected time of capture of a digital image frame "on the basis of" the initial time of capture of that digital image frame and the associated time offset may refer to determining the corrected time of capture by adding the associated time offset, which may have a negative or a positive value, to the initial time of capture. In other embodiments, other approaches may be used which take into account the initial time of capture and the appropriate time offset associated to the digital image frame at issue so that the initial time of capture and the associated time offset affect the outcome of the determination of the corrected time of capture.

In result of the adjustment of the metadata, the regular digital image frames captured by the first and the second capturing devices are put on a common timeline, allowing the regular digital image frames to be arranged and displayed in correct chronological order in accordance their times of capture on that common timeline.

In the example of FIG. 3, media data entities originating from two different capturing devices are obtained by the processing apparatus. In other embodiments, a processing unit of an apparatus may be configured to obtain media data entities captured by any number of capturing devices.

In embodiments, such as those discussed above with reference to FIG. 3, where media data entities originating from more than one capturing device are to be obtained, to facilitate the adjustment of the metadata of the digital image frames and possible digital audio samples correctly, a processing unit may be configured to recognize, for each digital image frame and digital audio sample, the associated capturing device by which the digital image frame or the digital audio sample was captured. This may help ensure that the reference digital image frames and the regular digital image frames and possible digital audio samples are combined correctly.

Figure 4:
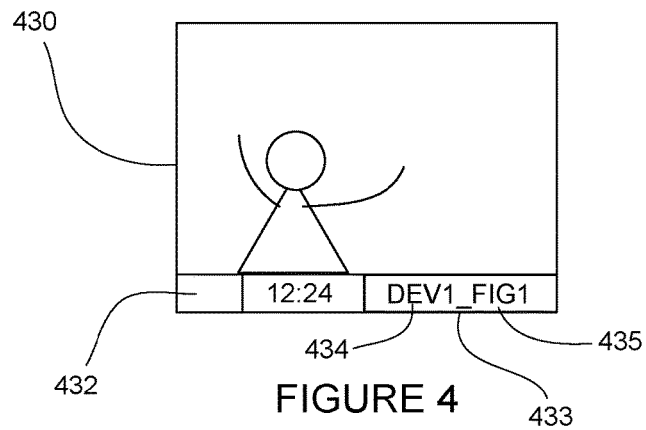
FIG. 4 illustrates schematically a media data entity comprising a digital image frame.

FIG. 4 illustrates a media data entity comprising a digital image frame 430, metadata 432 of which comprises a file name 433 which comprises a capturing device identifying part 434, indicating the capturing device by which the digital image frame was captured, and a file identifying part 435 identifying the actual digital image frame at issue. Such file name constitutes an example of identifying data on the basis of which, i.e. affected by which, a processing unit, such as that of the apparatus of FIG. 3 may be configured to recognize the associated capturing device on the basis of the identifying data. In other embodiments, other types of identifying data may be used.

Figure 5:
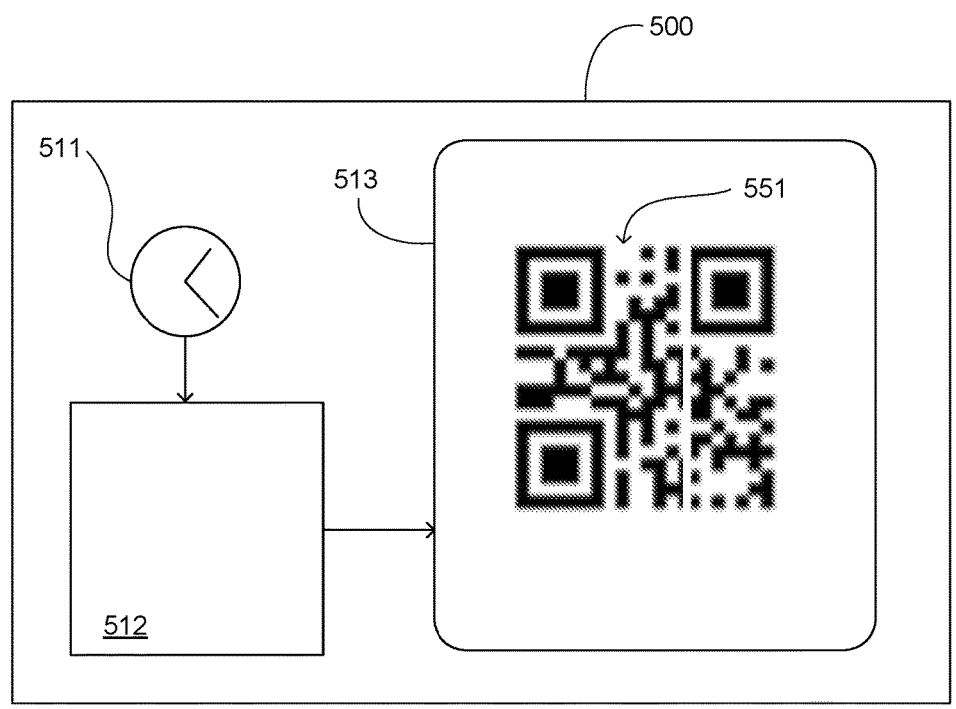
FIG. 5 illustrates an apparatus capable of showing an optical computer-readable time marking on its display.

FIG. 5 illustrates an apparatus which may be generally in accordance with any of those discussed above with reference to FIGS. 1 to 4. The apparatus additionally comprises an internal clock 511, a display controller 512, and a display 513. The display controller is connected to the internal clock so as the receive the time thereof, and configured to control the display so as to show a QR code 551 indicating reference time determined in accordance with the internal clock of the apparatus. The QR code represents one example of machine-readable time markings. In other embodiments, other types of time markings, such as any of those discussed above with reference to FIGS. 1 to 4 may be used.

In the example of FIG. 5, the apparatus 500 itself provides the reference time to allow a capturing device to capture a reference digital image frame of a scene comprising the QR code. This may provide some advantageous effects. For example, when user of a capturing device desires to send digital image frames to the apparatus 500, it may be sufficient to capture a reference digital image frame of the display 551 showing the QR code 551 at that time, not necessitating finding any time marking elsewhere to be captured in advance.

In any of the apparatuses discussed above with reference to FIGS. 3 and 4, which may further be in accordance with apparatuses discussed above with reference to FIG. 5, the processing unit may further be configured to scan the image data on the digital image frames of the obtained media data entities to detect any reference digital image frame, i.e. a digital image frame of a reference media data entity. Detecting may be based on seeking a machine-readable time marking of a specific type, such as a QR code.

Any such apparatus may constitute an example of an apparatus comprising a processing unit which is configured to: receive image data and associated metadata of a plurality of digital image frames captured by at least two different capturing devices, the metadata of each digital image frame comprising initial time of capture of the digital image frame, the times of capture of digital image frames captured by the same capturing device being determined in accordance with a common clock; scan the image data of digital image frames to detect reference digital image frames captured of scenes comprising an optical machine-readable time marking indicating reference time; and, for each detected reference digital image frame, recognize a reference instant of time on the basis of image data, i.e. affected by information contained in the image data, of that detected reference digital image frame, determine a time offset between the reference instant of time and the initial time of capture of that reference digital image frame; recognize at least one regular digital image frame, i.e. a digital image frame of a regular media data entity, captured by the same capturing device as that reference digital image frame; and adjust metadata of the at least one regular digital image frame so as to include corrected time of capture determined on the basis of the initial time of capture of that regular digital image frame and the time offset. One such apparatus is illustrated in FIG. 6.

Figure 6:
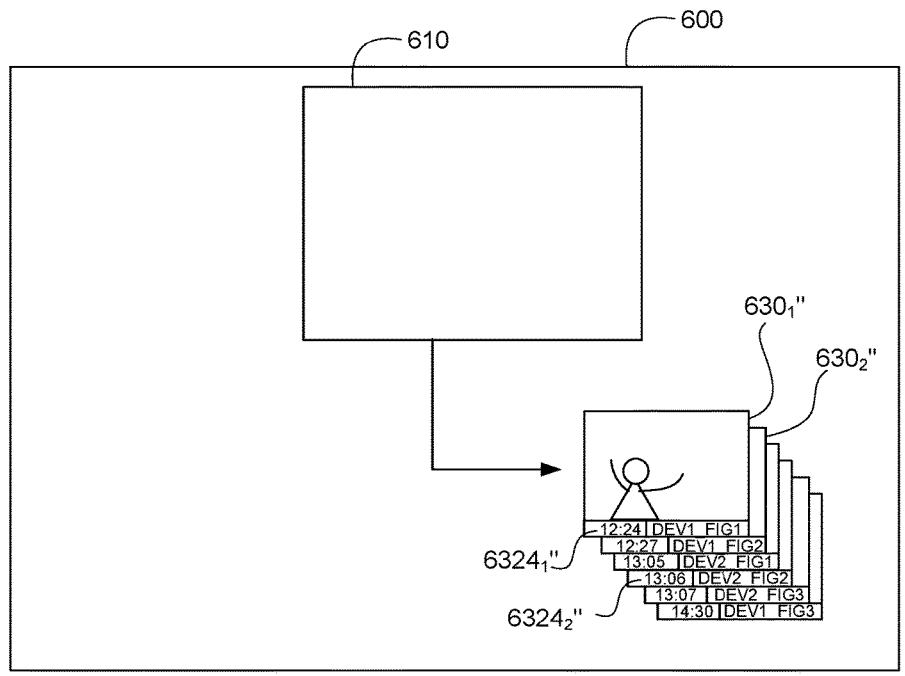
FIG. 6 illustrates schematically an apparatus capable of arranging digital image frames with adjusted times of capture into a chronological order.

The processing unit 610 of the apparatus 600 of FIG. 6 is configured to arrange a plurality of regular digital image frames 630$_1$", 630$_2$" captured by two different capturing devices (not illustrated) with adjusted metadata into chronological order in accordance with the corrected times of capture 6324$_1$", 6324$_2$". In other embodiments there may be digital image frames captured by any appropriate number of different capturing devices.

Figure 7:
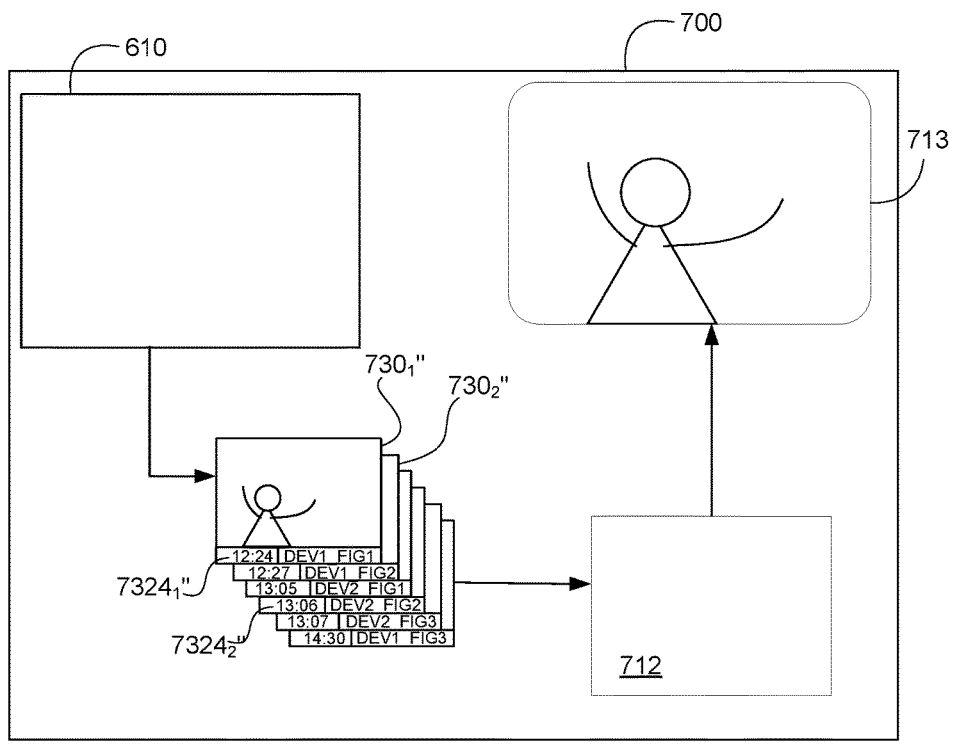
FIG. 7 illustrates schematically an apparatus capable of displaying digital image frames in chronological order.

The apparatus 700 of FIG. 7 differs from those discussed above with reference to FIG. 6 at least in that it further comprises a display 713 and a display controller 712, the display controller being configured receive the arranged regular digital image frames 730$_1$", 730$_2$" and to control the display to show them in chronological order in accordance with the corrected times of capture 7324$_1$", 7324$_2$". In other embodiments, a display controller 712 may be configured to carry out, instead of a processing unit, also the actual arrangement of the digital image frames.

In any embodiment discussed above, a display controller may be implemented as a separate controller or a part of a processing unit.

In any of the embodiments discussed above with reference to FIGS. 1 to 7, a QR code or another type of time marking may be a part of an optical machine-readable marking, which comprises also other information in addition to the time marking. For example, a QR code or a graphic binary marking may contain information of a source network destination to which a capturing apparatus may be instructed to share media data entities captured thereby.

The operations which the processing units and the display controllers of the apparatuses discussed above with reference to FIGS. 1 to 7 are configured to carry out constitute operations of example methods which may be carried out also by other apparatuses of any appropriate types. The methods discussed below with reference to FIG. 8 may be carried out by apparatuses generally in accordance with any of those discussed above with reference to FIGS. 1 to 7. Those apparatuses, in turn, may operate generally in accordance with any of the methods discussed below with reference to FIG. 8.

The definitions and advantages discussed above with reference to FIGS. 1 to 7 apply, mutatis mutandis, also to the methods discussed below with reference to FIG. 8.

Figure 8:
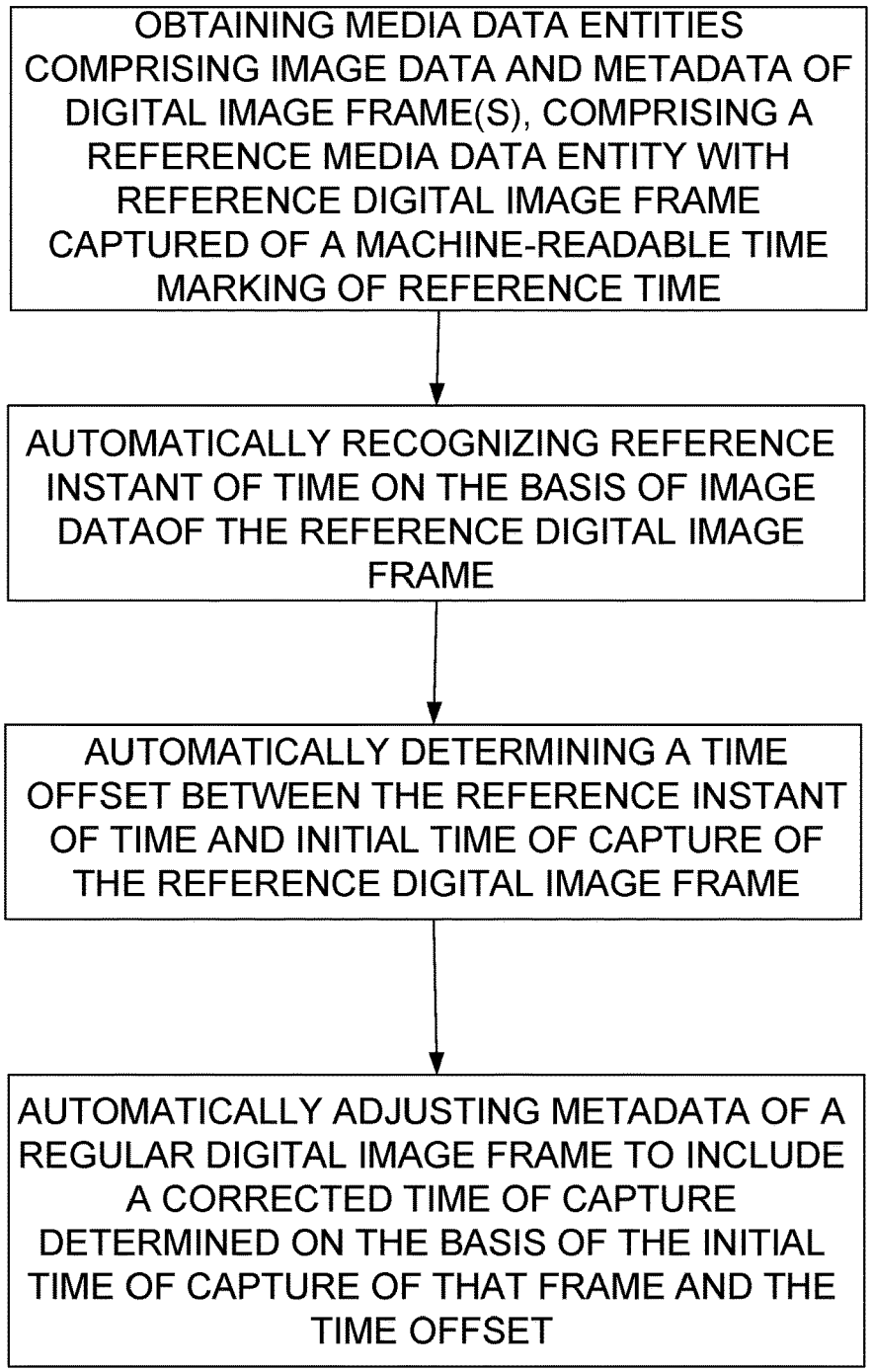
FIG. 8 illustrates a flow chart of a method for adjusting times of capture of digital image frames.

The method of FIG. 8 starts by obtaining, in operation 801, one or more media data entity comprising image data and metadata of a digital image frame captured by a capturing device, the metadata comprising initial time of capture of the digital image frame determined in accordance with an internal clock of the capturing device, the at least one media data entity comprising a reference media data entity comprising image data and metadata of a reference digital image frame captured of a scene comprising an optical machine-readable time marking indicating reference time.

In operation 802, a reference instant of time is automatically recognized on the basis of the image data of the reference digital image frame captured of the scene comprising the time marking indicating the reference time. The time marking may comprise a QR code or any other appropriate type of graphic binary code.

A time offset between the reference instant of time and the initial time of capture of the reference digital image frame is automatically determined in operation 803.

Metadata of one or more of the obtained digital image frames is automatically adjusted in operation 804 so as to include corrected time of capture which is determined on the basis of the initial time of capture of that digital image frame and the time offset.

"Automatically" performing one or more operations refers to performing the operation(s) at issue by one or more appropriate data processing units or modules, such as the process units and display controllers discussed above with reference to FIGS. 1 to 7, according to specific rules and procedures, without need for any contribution provided or determination performed by a user of an apparatus or device incorporating such unit or module. In addition to those operations specifically stated to be performed automatically, also other operations may be carried completely or partially automatically.

As discussed above with reference to FIGS. 1 to 7, the obtained media data entities may comprise a reference media data entity and one or more regular media data entities, wherein it is possible to adjust the metadata of one or more of the digital image frames of the regular media data entities.

Some embodiments are further discussed shortly in the following.

In an aspect, an apparatus comprises a processing unit configured to: obtain image data and metadata of at least one digital image frame captured by a capturing device, the metadata comprising initial time of capture of the digital image frame determined in accordance with an internal clock of the capturing device, the at least one digital image frame comprising a reference digital image frame captured of a scene comprising an optical machine-readable time marking indicating reference time; recognize a reference instant of time on the basis of the image data of the reference digital image frame; determine a time offset between the reference instant of time and the initial time of capture of the reference digital image frame; and adjust the metadata of an obtained digital image frame so as to include corrected time of capture, determined on the basis of the initial time of capture of that digital image frame and the time offset.

In an embodiment, the processing unit is configured to adjust the metadata of the digital image frame by adding the corrected time of capture to the metadata.

In an alternative embodiment, the processing unit is configured to adjust the metadata of the digital image frame by replacing the initial time of capture by the corrected time of capture.

In an embodiment, which may be in accordance with any of the preceding embodiments, the at least one digital image frame comprises the reference digital image frame and a plurality of regular digital image frames captured by the capturing device; the processing unit being configured to adjust metadata of each regular digital image frame so as to include corrected time of capture determined on the basis of the initial time of capture of that digital image frame and the time offset.

In an embodiment, which may be in accordance with any of the preceding embodiments, the processing unit is further configured to receive audio data and metadata of at least one digital audio sample captured by the capturing device, the metadata of the digital audio sample comprising initial time of capture of the digital audio sample; the processing unit being configured to adjust the metadata of the digital audio sample so as to include corrected time of capture, determined on the basis of the initial time of capture of the digital audio sample and the time offset.

In an embodiment, which may be in accordance with any of the preceding embodiments, the at least one digital image frame comprises: at least one first digital image frame captured by a first capturing device comprising a first internal clock; and at least one second digital image frame captured by a second capturing device comprising a second internal clock; the metadata of the digital image frames captured by the first and the second capturing devices comprising initial times of capture determined in accordance with the first and the second internal clocks, respectively; the first and the second digital image frames comprising a first and a second reference digital image frame, respectively, captured of a first and a second scene comprising a first and a second optical machine-readable time marking, respectively, both time markings indicating common reference time; the processing unit being configured, in order to carry out the recognition of a reference instant of time, the determination of a time offset, and the adjustment of the metadata, to: recognize first and second reference instants of time on the basis of the image data of the first and the second reference digital image frames, respectively; determine a first and a second time offset between the first and the second reference instants of time and the initial times of capture of the first and the second reference digital image frames, respectively; adjust metadata of a first digital image frame so as to include corrected time of capture determined on the basis of the initial time of capture of that digital image frame and the first time offset; and adjust metadata of a second digital image frame so as to include corrected time of capture determined on the basis of the initial time of capture of that digital image frame and the second time offset.

In an embodiment, which may be in accordance with the previous embodiment, the processing unit is further configured to recognize the associated capturing device by which a digital image frame was captured.

In an embodiment, which may be in accordance with the previous embodiment, metadata of an obtained digital image frame comprises identifying data indicating the associated capturing device, and the processing unit is configured to recognize the associated capturing device on the basis of the identifying data.

In an embodiment, which may be in accordance with the previous embodiment, the identifying data comprises a file name.

In an embodiment, which may be in accordance with any of the preceding embodiments, the apparatus further comprises an internal clock, a display, and a display controller, the display controller being configured control the display so as to show an optical machine-readable time marking indicating reference time determined in accordance with the internal clock of the apparatus.

In an embodiment, which may be in accordance with any of the preceding embodiments, time marking comprises a graphic binary code.

In an embodiment, which may be in accordance with the previous embodiment, the graphic binary code comprises a QR (Quick Response) code.

In an embodiment, which may be in accordance with any of the preceding embodiments, the apparatus is implemented as one of server computer, personal computer, laptop computer, tablet computer, smartphone, mobile phone, and a digital image displaying apparatus.

In a second aspect, an apparatus comprises a processing unit configured to: receive image data and associated metadata of a plurality of digital image frames captured by at least two different capturing devices, the metadata of each digital image frame comprising initial time of capture of the digital image frame, the times of capture of digital image frames captured by the same capturing device being determined in accordance with a common clock; to scan the image data of digital image frames to detect reference digital image frames captured of scenes comprising an optical machine-readable time marking indicating reference time; and, for each detected reference digital image frame; to recognize a reference instant of time on the basis of image data of that detected reference digital image frame; to determine a time offset between the reference instant of time and the initial time of capture of that reference digital image frame; to recognize at least one regular digital image frame captured by the same capturing device as that reference digital image frame; and to adjust metadata of the at least one regular digital image frame so as to include corrected time of capture determined on the basis of the initial time of capture of that regular digital image frame and the time offset.

In an embodiment, the optical machine-readable time marking comprises a graphic binary code such as a linear barcode or a matrix barcode.

In an embodiment, which may be in accordance with the previous embodiment, the processing unit is further configured to arrange a plurality of regular digital image frames with adjusted metadata into chronological order in accordance with the corrected times of capture.

In an embodiment, which may be in accordance with any of the preceding embodiments of the second aspect, the apparatus further comprises a display and a display controller, the display controller being configured to control the display to show a plurality of regular digital image frames with adjusted metadata into chronological order in accordance with the corrected times of capture.

In a third aspect, a method comprises obtaining image data and metadata of at least one digital image frame captured by a capturing device, the metadata comprising initial time of capture of the digital image frame determined in accordance with an internal clock of the capturing device, the at least one digital image frame comprising a reference digital image frame captured of a scene comprising an optical machine-readable time marking indicating reference time; automatically recognizing a reference instant of time on the basis of the image data of the reference digital image frame; automatically determining a time offset between the reference instant of time and the initial time of capture of the reference digital image frame; and automatically adjusting metadata of an obtained digital image frame so as to include corrected time of capture, determined on the basis of the initial time of capture of that digital image frame and the time offset.

In an embodiment, the method comprises automatically adjusting the metadata of the digital image frame by adding the corrected time of capture to the metadata.

In an alternative embodiment, the method comprises automatically adjusting the metadata of the digital image frame by replacing the initial time of capture by the corrected time of capture.

In an embodiment, which may be in accordance with any of the preceding embodiments of the third aspect, the at least one digital image frame entity comprises the reference digital image frame and a plurality of regular digital image frames captured by the capturing device; and method comprises automatically adjusting metadata of each regular digital image frame so as to include corrected time of capture determined on the basis of the initial time of capture of that digital image frame and the time offset.

In an embodiment, which may be in accordance with any of the preceding embodiments of the third aspect, the method further comprises obtaining audio data and metadata of at least one digital audio sample captured by the capturing device, the metadata of the digital audio sample comprising initial time of capture of the digital audio sample; and the method comprises automatically adjusting the metadata of the digital audio sample so as to include corrected time of capture, determined on the basis of the initial time of capture of the digital audio sample and the time offset.

In an embodiment, which may be in accordance with any of the preceding embodiments of the third aspect, the at least one digital image frame comprises: at least one first digital image frame captured by a first capturing device comprising a first internal clock; and at least one second digital image frame captured by a second capturing device comprising a second internal clock; the metadata of the digital image frames captured by the first and the second capturing devices comprising initial times of capture determined in accordance with the first and the second internal clocks, respectively; the first and the second digital image frames comprising a first and a second reference digital image frame, respectively, captured of a first and a second scene comprising a first and a second optical machine-readable time marking, respectively, both time markings indicating common reference time; and the method comprises automatically recognizing first and second reference instants of time on the basis of the image data of the first and the second reference digital image frames, respectively; automatically determining a first and a second time offset between the first and the second reference instants of time and the initial times of capture of the first and the second reference digital image frames, respectively; automatically adjusting metadata of a first digital image frame so as to include corrected time of capture determined on the basis of the initial time of capture of that digital image frame and the first time offset; and automatically adjusting metadata of a second digital image frame so as to include corrected time of capture determined on the basis of the initial time of capture of that digital image frame and the second time offset.

In an embodiment, which may be in accordance with the previous embodiment, the method further comprises automatically recognizing the associated capturing device by which a digital image frame was captured.

In an embodiment, which may be in accordance with the previous embodiment, metadata of an obtained digital image frame comprises identifying data indicating the associated capturing device, and the method comprises automatically recognizing the associated capturing device on the basis of the identifying data.

In an embodiment, which may be in accordance with the previous embodiment, the identifying data comprises a file name.

In an embodiment, which may be in accordance with any of the preceding embodiments of the third aspect, time marking comprises a graphic binary code.

In an embodiment, which may be in accordance with the previous embodiment, the graphic binary code comprises a QR (Quick Response) code.

In a fourth aspect, a computer program, which may be stored on a computer-readable medium, may comprise program code instructions which, when run on a processor, cause the processor to carry out at least part of the operations of the method of the third aspect or any of the specific embodiments thereof discussed above.

The embodiments illustrated and described herein as well as embodiments not specifically described herein but within the scope of aspects of the claims constitute example means for enabling arranging digital image frames possibly captured by several capturing devices in chronological order on a specific reference timeline. For example, the processing units, when configured to obtain the media data entities or image data and metadata of digital image frames, to recognize the reference times of capture, to determine the time offsets, and to adjust the metadata, constitute example means for obtaining media data entities or image data and metadata of digital image frames, recognizing reference times of capture, determining time offsets, and adjusting metadata of digital image frames.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and portable devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. An apparatus comprising a processing unit configured to:
    obtain image data and metadata of at least one digital image frame captured by a capturing device, the metadata comprising initial time of capture of the digital image frame determined in accordance with an internal clock of the capturing device, the at least one digital image frame comprising a reference digital image frame captured of a scene comprising an optical machine-readable time marking indicating reference time;
    recognize a reference instant of time on the basis of the image data of the reference digital image frame;

determine a time offset between the reference instant of time and the initial time of capture of the reference digital image frame; and adjust the metadata of an obtained digital image frame so as to include corrected time of capture, determined on the basis of the initial time of capture of that digital image frame and the time offset.

2. An apparatus as defined in claim 1, wherein the processing unit is configured to adjust the metadata of the digital image frame by adding the corrected time of capture to the metadata.

3. An apparatus as defined in claim 1, wherein the processing unit is configured to adjust the metadata of the digital image frame by replacing the initial time of capture by the corrected time of capture.

4. An apparatus as defined in claim 1, wherein the at least one digital image frame comprises the reference digital image frame and a plurality of regular digital image frames captured by the capturing device; the processing unit being configured to adjust metadata of each regular digital image frame so as to include corrected time of capture determined on the basis of the initial time of capture of that digital image frame and the time offset.

5. An apparatus as defined in claim 1, wherein the processing unit is further configured to obtain audio data and metadata of at least one digital audio sample captured by the capturing device, the metadata of the digital audio sample comprising initial time of capture of the digital audio sample; the processing unit being configured to adjust the metadata of the digital audio sample so as to include corrected time of capture, determined on the basis of the initial time of capture of the digital audio sample and the time offset.

6. An apparatus as defined in claim 1, wherein the at least one digital image frame comprises:
at least one first digital image frame captured by a first capturing device comprising a first internal clock; and
at least one second digital image frame captured by a second capturing device comprising a second internal clock;
the metadata of the digital image frames captured by the first and the second capturing devices comprising initial times of capture determined in accordance with the first and the second internal clocks, respectively; the first and the second digital image frames comprising a first and a second reference digital image frame, respectively, captured of a first and a second scene comprising a first and a second optical machine-readable time marking, respectively, both time markings indicating common reference time; the processing unit being configured, in order to carry out the recognition of a reference instant of time, the determination of a time offset, and the adjustment of the metadata, to:
recognize first and second reference instants of time on the basis of the image data of the first and the second reference digital image frames, respectively;
determine a first and a second time offset between the first and the second reference instants of time and the initial times of capture of the first and the second reference digital image frames, respectively;
adjust metadata of a first digital image frame so as to include corrected time of capture determined on the basis of the initial time of capture of that digital image frame and the first time offset; and
adjust metadata of a second digital image frame so as to include corrected time of capture determined on the basis of the initial time of capture of that digital image frame and the second time offset.

7. An apparatus as defined in claim 6, wherein the processing unit is further configured to recognize the associated capturing device by which a digital image frame was captured.

8. An apparatus as defined in claim 7, wherein metadata of an obtained digital image frame comprises identifying data indicating the associated capturing device, and the processing unit is configured to recognize the associated capturing device on the basis of the identifying data.

9. An apparatus as defined in claim 8, wherein the identifying data comprises a file name.

10. An apparatus as defined in claim 1, further comprising an internal clock, a display, and a display controller, the display controller being configured control the display so as to show an optical machine-readable time marking indicating reference time determined in accordance with the internal clock of the apparatus.

11. An apparatus as defined in claim 1, wherein the time marking comprises a graphic binary code.

12. An apparatus as defined in claim 11, wherein the graphic binary code comprises a QR (Quick Response) code.

13. An apparatus as defined in claim 1, implemented as one of server computer, personal computer, laptop computer, tablet computer, smartphone, mobile phone, and a digital image displaying apparatus.

14. An apparatus comprising a processing unit configured to:
receive image data and associated metadata of a plurality of digital image frames captured by at least two different capturing devices, the metadata of each digital image frame comprising initial time of capture of the digital image frame, the times of capture of digital image frames captured by the same capturing device being determined in accordance with a common clock;
scan the image data of digital image frames to detect reference digital image frames captured of scenes comprising an optical machine-readable time marking indicating reference time; and, for each detected reference digital image frame;
recognize a reference instant of time on the basis of image data of that detected reference digital image frame;
determine a time offset between the reference instant of time and the initial time of capture of that reference digital image frame;
recognize at least one regular digital image frame captured by the same capturing device as that reference digital image frame; and
adjust metadata of the at least one regular digital image frame so as to include corrected time of capture determined on the basis of the initial time of capture of that regular digital image frame and the time offset.

15. An apparatus as defined in claim 14, wherein the optical machine-readable time marking comprises a graphic binary code such as a linear barcode or a matrix barcode.

16. An apparatus as defined in claim 14, wherein the processing unit is further configured to arrange a plurality of regular digital image frames with adjusted metadata into chronological order in accordance with the corrected times of capture.

17. An apparatus as defined in claim 14, further comprising a display and a display controller, the display controller being configured to control the display to show a plurality of regular digital image frames with adjusted metadata into chronological order in accordance with the corrected times of capture.

18. A method comprising:

obtaining image data and metadata of at least one digital image frame captured by a capturing device, the metadata comprising initial time of capture of the digital image frame determined in accordance with an internal clock of the capturing device, the at least one digital image frame comprising a reference digital image frame captured of a scene comprising an optical machine-readable time marking indicating reference time;

automatically recognizing a reference instant of time on the basis of the image data of the reference digital image frame;

automatically determining a time offset between the reference instant of time and the initial time of capture of the reference digital image frame; and automatically adjusting metadata of an obtained digital image frame so as to include corrected time of capture, determined on the basis of the initial time of capture of that digital image frame and the time offset.

19. A method as defined in claim 18, wherein the at least one digital image frame comprises the reference digital image frame and a plurality of regular digital image frames captured by the capturing device; the method comprising adjusting metadata of each regular digital image frame so as to include corrected time of capture determined on the basis of the initial time of capture of that digital image frame and the time offset.

20. A method as defined in claim 18, wherein the optical machine-readable time marking comprises a QR code.

* * * * *